United States Patent [19]

Hata et al.

[11] Patent Number: 4,707,410

[45] Date of Patent: Nov. 17, 1987

[54] MAGNETIC RECORDING MEDIA

[75] Inventors: Kotaro Hata; Eitaro Nakamura, both of Kawasaki, Japan

[73] Assignee: Nippon Zeon Co., Ltd., Tokyo, Japan

[21] Appl. No.: 903,969

[22] Filed: Sep. 5, 1986

[30] Foreign Application Priority Data

Sep. 11, 1985 [JP] Japan ............................ 60-201436
Oct. 11, 1985 [JP] Japan ............................ 60-226199
Nov. 11, 1985 [JP] Japan ............................ 60-252285
Mar. 28, 1986 [JP] Japan ............................ 61-70485
Mar. 28, 1986 [JP] Japan ............................ 61-70486
Mar. 28, 1986 [JP] Japan ............................ 61-70487

[51] Int. Cl.$^4$ ............................................ G11B 5/702
[52] U.S. Cl. ................................. 428/413; 252/62.54; 427/128; 428/522; 428/694; 428/900; 428/695
[58] Field of Search .............. 428/694, 329, 328, 900, 428/425.9, 522, 413, 695; 252/62.54; 360/134–136; 427/128

[56] References Cited

U.S. PATENT DOCUMENTS

| | | | |
|---|---|---|---|
| 4,368,237 | 1/1983 | Yamada | 427/128 |
| 4,520,079 | 5/1985 | Nakajima | 427/128 |
| 4,521,486 | 6/1985 | Ninomiya | 428/900 |
| 4,526,837 | 7/1985 | Ohtsuki | 428/900 |
| 4,529,661 | 7/1985 | Ninomiya | 428/328 |
| 4,562,117 | 12/1985 | Kikukawa | 427/128 |
| 4,594,174 | 6/1986 | Nakayama . | |
| 4,600,521 | 7/1986 | Nakamura | 428/900 |
| 4,613,545 | 9/1986 | Chubachi | 427/128 |

Primary Examiner—Ellis P. Robinson
Attorney, Agent, or Firm—Sherman and Shalloway

[57] ABSTRACT

A magnetic recording medium characterized by having a magnetic layer containing an epoxy group-containing vinyl chloride resin and at least one additive selected from the group consisting of (1) a phosphoric acid ester compound, (2) a carboxylic acid compound having pKa of 4 or less, (3) a sulfuric acid monoester compound and (4) a sulfonic acid compound.

9 Claims, No Drawings

MAGNETIC RECORDING MEDIA

This invention relates to an improved magnetic recording medium, and more particularly to a magnetic recording medium excellent in dispersibility, heat stability and durability.

Magnetic recording media such as magnetic tapes and magnetic cards are generally produced by coating magnetic coatings containing magnetic powders and binders thereof as a magnetic layer on substrates such as polyester films. In recent years, magnetic fine powders having a great specific surface area have been used as said magnetic powders in order to increase a coercive force and a maximum saturated magnetization amount and improve an SN ratio or a recording density.

When magnetic coatings are prepared using as binders of such fine magnetic powders vinyl chloride copolymer resins such as a vinyl chloride-vinyl acetate-vinyl alcohol copolymer resin, a vinyl chloride-vinyl acetate-maleic acid copolymer resin and a vinyl chloride-vinyl acetate-maleic acid-vinyl alcohol copolymer resin, there are defects that the coatings are thickened and poor in dispersibility.

Accordingly, a method of dispersing magnetic powders by applying a high shear force is taken to enhance the dispersibility of the magnetic powders. However, this method causes thickening of coatings and heat decomposition of vinyl chloride copolymer resins due to increase of temperatures, which leads to deterioration of magnetic powders owing to a hydrogen chloride gas and decrease of durability of magnetic recording media.

On the other hand, addition of so-called stabilizers for vinyl chloride resins has been so far well known as a method of preventing heat decomposition of vinyl chloride copolymer resins. Typical examples of this method are a method of adding low-molecular epoxide compounds such as epoxidized soybean oils and n-butylglycidyl ether, and a method of adding liquid organotin compound such as dibutyltin laurate and dibutyltin maleate.

However, where large amounts of the lowmolecular epoxide compounds are present in a magnetic recording medium, a bleeding phenomenon occurs from the magnetic recording medium, and decrease of durability or contamination of heads takes place. For this reason, the amounts thereof are naturally limited, and the effects are thus restricted. Where organotin compounds are added, they become catalysts for crosslinking reaction of isocyanate compounds commonly added to the binders; consequently, a pot life of magnetic coatings notably shortens, a stability of coatings decreases and a density increases greatly during coating, which results in decrease of the dispersibility or loss of a surface smoothness of a magnetic layer.

It has been proposed that magnetic coated films are crosslinked by electron rays for the purpose of providing magnetic recording media having an excellent durability without a problem of a pot life. However, as the binders or additives do not altogether provide sufficient properties, intended magnetic recording media cannot be obtained.

The present inventors have made extensive studies to prevent the heat decomposition of vinyl chloride copolymer resins occurring in preparing high-density magnetic recording media and to remedy defects such as decrease in durability of the high-density magnetic recording media. As a result, they have found that high-density magnetic recording media having an excellent heat stability at the time of preparing coatings and a high durability can be obtained by using epoxy group-containing vinyl chloride resins as a binder of a magnetic powder and combining therewith specific compounds as an additive. This finding has led to completion of this invention.

This invention is thus to provide a magnetic recording medium characterized by having a magnetic layer containing an epoxy group-containing vinyl chloride resin and at least one additive selected from the group consisting of (1) a phosphoric acid ester compound, (2) a carboxylic acid compound having pKa of 4 or less, (3) a sulfuric acid monoester compound and (4) a sulfonic acid compound.

The epoxy group-containing vinyl chloride resin is obtained by (1) a method wherein vinyl chloride and an epoxy group-containing radical polymerizable monomer copolymerizable with vinyl chloride and if required, another monomer copolymerizable with these monomers are polymerized in the presence of a radical generator, or (2) a method wherein polyvinyl chloride or a copolymer resin composed mainly of vinyl chloride or a resin obtained by partially dehydrochlorinating these chlorinated substances on heating or contacting with a dehydrochlorinating agent is epoxidized with an epoxidizing agent such as peroxycarboxylic acid.

Examples of the epoxy group-containing radical polymerizable monomer are glycidyl ethers of unsaturated alcohols such as allylglycidyl ether and methallylglycidyl ether; glycidyl esters of unsaturated acids such as glycidyl acrylate, glycidyl methacrylate, glycidyl-p-vinyl benzoate, methylglycidyl itaconate, glycidylethyl maleate, glycidylvinyl sulfonate and glycidyl(meth)allyl sulfonate; epoxide epoxide olefins such as butadiene monoxide, vinylcyclohexene monoxide and 2-methyl-5,6-epoxyhexene.

Examples of another monomer used, if required, with vinyl chloride and the epoxy group-containing radical polymerizable monomer are carboxylic acid vinyl esters such as vinyl acetate and vinyl propionate; vinyl ethers such as methyl vinyl ether, isobutyl vinyl ether and cetyl vinyl ether; halogenated vinylidenes such as vinylidene chloride and vinylidene fluoride; unsaturated carboxylic acid esters such as diethyl maleate, butylbenzyl maleate, di-2-hydroxyethyl maleate, dimethyl itaconate, methyl (meth)acrylate, ethyl (meth)acrylate, lauryl (meth)acrylate and 2-hydroxypropyl (meth)acrylate; olefins such as ethylene and propylene; unsaturated nitriles such as (meth)acrylonitrile; and aromatic vinyls such as styrene, α-methylstyrene and p-methylstyrene. These monomers are properly selected for the purpose of improving the solubility of the resins in this invention while adjusting a compatibility and softening points of said resins when they are mixed, and according to the necessity to improve properties of coated films or the coating step.

Epoxy group-containing vinyl chloride resins in which a hydrophilic group has been introduced to improve the dispersibility of the magnetic powder are preferable as the binder. Examples of such hydrophilic group are $COOM$, $SO_3M$, $SO_4M$, $PO_3M_2$ and $PO_4M_2$ (wherein M is hydrogen, an alkali metal or ammonium).

It is advisable that the amount of the epoxy group in the vinyl chloride resin of this invention is in the range of 0.1 to 20% by weight. Where the amount is less than 0.1% by weight, the purpose of this invention cannot be attained. Where the amount is more than 20% by weight, the amount of vinyl chloride relatively lowers and properties of the resin decrease. The amount of vinyl chloride in the resin is usually 20% by weight or more, preferably, 50 to 95% by weight. If the amount is less than 20% by weight, properties of the resin decrease and a strength of the coated film is poor, so that the resin is unusable as the binder. It is advisable that an average degree of polymerization of the resin is 100 to 1000. If it is less than 100, a strength of a coated film in a magnetic layer and a heat stability are poor. If it exceeds 1000, a dispersibility of a magnetic powder and a solubility of the resin decrease.

Typical examples of the phosphoric acid ester compound as the additive (1) can be a group of compounds represented by formulas, $$(RO)_l PO(HO)_{3-l} \quad (a)$$

$$[RO(A)_n]_l PO(OH)_{3-l} \quad (b) \text{ and}$$

$$[RCOO(AO)_n]_l PO(OH)_{3-l} \quad (c)$$

wherein
R denotes an alkyl group having 1 to 22 carbon atoms, a phenyl group, an alkylphenyl group or an alkenyl group, A denotes an alkylene group having 2 to 4 carbon atoms, l is 1 to 3 and n is 1 to 30.

The phosphoric acid ester compound represented by formula (a) is a phosphoric acid monoester, a phosphoric acid diester, a phosphoric acid sesquiester or a phosphoric acid triester derived from phosphoric acid and an alkanol having 1 to 22 carbon atoms, an alkylphenol or an alkenol. Concrete examples thereof are monododecyl phosphate, didodecyl phosphate, sesquidodecyl phosphate, sesquipropyl phosphate, sesquioctyl phosphate, sesquioleyl phosphate, monohexyl phosphate, dihexyl phosphate, monooleyl phosphate, monobutyl phosphate, dimethyl phosphate and dinorylphenyl phosphate.

The compound represented by formula (b) is a phosphoric acid monoester, a phosphoric acid diester, a phosphoric acid sesquiester or a phosphoric acid triester derived from phosphoric acid and a lower alkylene oxide addition product of an alkanol having 1 to 22 carbon atoms, an alkylphenol or an alkenol. Concrete examples thereof are sesquidodecylpolyoxyethylene(3) phosphate, sesquidodecylpolyoxyethylene(9) phosphate, monododecylpolyoxyethylene(5) phosphate, monooctadecylpolyoxyethylene(5) phosphate, sesquioctadecylpolyoxyethylene(15) phosphate, dioctylpolyoxyethylene(6) phosphate, sesquidodecylpolyoxypropylene(9) phosphate, monooctylpolyoxyethylene(12) phosphate, monooctadecenylpolyoxypropylene(8) phosphate, dinorylphenylpolyoxyethylene(4) phosphate, monobutylphenylpolyoxyethylene(6) phosphate and trioleylpolyoxyethylene(4) phosphate.

The compound represented by formula (c) is a phosphoric acid monoester, a phosphoric acid diester, a phosphoric acid sesquiester or a phosphoric acid triester derived from phosphoric acid and a lower alkylene oxide of an aliphatic acid having 1 to 22 carbon atoms. Concrete examples thereof are:

[C$_{11}$H$_{25}$COO(CH$_2$CH$_2$O)$_{10}$]$_{1.5}$PO(OH)$_{1.5}$
C$_{17}$H$_{33}$COO(CH$_2$CH$_2$O)$_3$PO(OH)$_2$
C$_{17}$H$_{35}$COO(CH$_2$CH$_2$O)$_{15}$PO(OH)$_2$
[C$_5$H$_{11}$COO(CH$_2$CH$_2$O)$_2$]$_2$PO(OH)
[CH$_2$:C(CH$_3$)COO(CH$_2$CH$_2$O)]$_{1.5}$PO(OH)$_{1.5}$

CH$_2$:C(CH$_3$)COO[CH$_2$CH(CH$_2$Cl)O]PO(OH)$_2$

The carboxylic acid compound as the additive (2) has to have pKa (in case of polybasic carboxylic acids, it indicates hereinafter pKa$_1$ unless otherwise instructed) of 4 or less. Where pKa is more than 4, a durability cannot improve. The carboxylic acid compound having pKa of 4 or less is a saturated or unsaturated aliphatic monobasic or polybasic carboxylic acid compound, or an aromatic monobasic or polybasic carboxylic acid compound. Concrete examples thereof are formic acid, monochloroacetic acid, dichloroacetic acid, trichloroacetic acid, α-chloroacrylic acid, α-chlorobutyric acid, monofluoroacetic acid, monobromoacetic acid, monoiodoacetic acid, p-nitrobenzoic acid, m-nitrobenzoic acid, o-nitrobenzoic acid, m-chlorobenzoic acid, o-chlorobenzoic acid, o-toluic acid, 3,5-dinitrobenzoic acid, salicylic acid, oxalic acid, malic acid, maleic acid, fumaric acid, phthalic acid, isophthalic acid, terephthalic acid, hemimellitic acid, trimellitic acid, trimesic acid, prehnitic acid, mellophanic acid, pyromellitic acid, benzenepentacarboxylic acid, mellitic acid, phenylpropiolic acid, o-phenylenediacetic acid, glyoxylic acid, pyruvic acid, acetoacetic acid, glycolic acid, (±)-lactic acid, (±)-mandelic acid, (−)-malic acid, (±)-malic acid, (+)-tartaric acid, (−)-tartaric acid, (±)-tartaric acid, mesotartaric acid and citric acid.

Typical examples of the sulfuric acid monoester as the additive (3) can be a group of compounds represented by formulas, $$ROSO_2OH \quad (a)$$

$$RO(AO)_n SO_2OH \quad (b) \text{ and}$$

$$RCOO(AO)_n SO_2OH \quad (c)$$

wherein
R denotes an alkyl group having 1 to 22 carbon atoms, a phenyl group, an alkylphenyl group, an alkenyl group or an alkenylphenyl group, A denotes an alkylene group having 2 to 4 carbon atoms and n is an integer of 1 to 30.

The sulfuric acid monoester represented by formula (a) is derived from sulfuric acid and an alkanol having 1 to 22 carbon atoms, a (alkyl)phenol, an (alkyl)alkenol or an alkene. Concrete examples thereof are butylsulfuric acid monoester, octylsulfuric acid monoester, dodecylsulfuric acid monoester and oleylsulfuric acid monoester.

The compound represented by formula (b) is a sulfuric acid monoester derived from sulfuric acid and a lower alkylene oxide addition product of an alkanol having 1 to 22 carbon atoms, a (alkyl)phenol or an alkenol. Concrete examples thereof are polyoxyethylene(4) dodecylether sulfuric acid monoester, polyoxyethylene(5) octylether sulfuric acid monoester, and polyoxypropylene(6) nonylphenylether sulfuric acid monoester.

The compound represented by formula (c) is a sulfuric acid monoester derived from sulfuric acid and a lower alkylene oxide ester of an aliphatic acid having 1 to 22 carbon atoms. Concrete examples thereof are:

C$_5$H$_{11}$COO(CH$_2$CH$_2$O)$_2$SO$_2$OH
C$_{11}$H$_{25}$COO(CH$_2$CH$_2$O)$_{10}$SO$_2$OH
C$_{17}$H$_{33}$COO(CH$_2$CH$_2$O)$_3$SO$_2$OH
CH$_2$:C(CH$_3$)COO(CH$_2$CH$_2$O)SO$_2$OH

The sulfonic acid compound as the additive (4) is selected from alkylarylsulfonic acids, arylsulfonic acids, alkylsulfonic acids, dialkyl sulfosuccinates, polyoxyethylenealkylarylether sulfosuccinic acids and naphthalene-sulfonic acid. Concrete examples thereof are dodecylbenzenesulfonic acid, tridecylbenzenesulfonic acid, p-toluenesulfonic acid, dodecylsulfonic acid, styrenesulfonic acid and 2-acrylamide-2-methylpropanesulfonic acid.

The amount of the additive in this invention is 0.05 to 5.0 chemical equivalents per chemical equivalent of the epoxy group in the epoxy group-containing vinyl chloride resin. Where the amount is less than 0.05 chemical equivalent, the improvement in durability of the magnetic layer aimed at by this invention can hardly be attained. Where it exceeds 5.0 chemical equivalents, the dispersibility of the magnetic powder decreases and the durability decreases too.

In this invention, flexible resins such as known polyurethane resins, polyester resins and acrylonitrilebutadiene copolymer resins may be contained as the other binder than the epoxy group-containing vinyl chloride resin in order to improve the adhesion and impart the durability. These flexible resins may contain an epoxy group, or a functional group such as COOM, $SO_3M$, $SO_4M$, $PO_3M_2$ or $PO_4M_2$ (wherein M is hydrogen, an alkali metal or ammonium) for improving the dispersibility of the magnetic powder.

The magnetic powder available in this invention may be any of Fe, Co, Fe alloy, Co containing $\gamma$-$Fe_2O_3$, Co-containing $Fe_3O_4$, $\gamma$-$Fe_2O_3$ and barium-ferrite powders.

Ordinary materials such as lubricants, dispersants, antistatic agents and abrasives, and ordinary resins for magnetic coatings such as phenoxy resins, cellulosic resins, amino resins, butyral resins and acrylic resins are also usable if required within such range as not to interfere with attaining the purpose of this invention. Moreover, usual polyisocyanate compounds may be added within the customary range to perform a crosslinking reaction by an isocyanate reaction.

If the compound containing an unsaturated group such as an alkenyl group is used as an additive, the resulting coated film can be crosslinked and cured by irradiation of electron rays. On this occassion, electron ray-curable resins, oligomers and monomers having one or more unsaturated bonds in a molecule may be conjointly used.

The magnetic recording medium of this invention is produced by dispersing in an optional organic solvent a mixture comprising the epoxy group-containing vinyl chloride resin, the additive, the magnetic powder and the above desirable components, coating the resulting magnetic coating as the magnetic layer onto a substrate such as a polyethylene film in a usual manner by an ordinary means such as spray coating or roll coating, and drying the coated film.

The present invention can thus provide the magnetic recording medium excellent in heat stability, dispersibility and durability compared to the conventional art.

By the way, the heat stability in this invention can presumably be achieved such that the epoxy group in the molecular chain captures hydrogen chloride occurring by the heat decomposition of the vinyl chloride resin to stop a chain reaction of decomposition. This effect can be also attained by a known method of adding a low-molecular epoxy compound such as an epoxidized soybean oil to the binder. However, this invention can exhibit the quite excellent improved effect without the defects in the conventional method such as contamination of heads owing to bleeding onto the surface of the magnetic layer, decrease in tape running property due to increase in stickiness of tapes, and so forth.

According to this invention, the epoxy group in the vinyl chloride resin acts as a heat stabilizer and the acid group in the additive as a dispersant, making it possible to afford the magnetic coating having excellent heat stability and dispersibility. Moreover, in the steps subsequent to the step of shaping the surface of the coated magnetic coating, the reaction of both the components also proceeds, which contributes greatly to improvement in abrasion resistance and durability of the coated film.

The following Examples illustrate this invention in more detail. All parts and percentages in Examples and Comparative Examples are on the weight basis unless otherwise instructed.

SYNTHESIS EXAMPLE 1

Allylglycidyl ether, vinyl chloride and 2-hydroxypropyl methacrylate were emulsion polymerized using potassium peroxide to obtain a vinyl chloride copolymer resin (A) having an epoxy group content of 3.5%, a —$SO_4$ content of 0.7%, a hydroxyl group content of 0.7% and a vinyl chloride content of 84%.

SYNTHESIS EXAMPLE 2

Vinylcyclohexene monoxide, vinyl chloride and vinyl acetate were suspension polymerized using 2,2'-azobisisobutyronitrile to afford a vinyl chloride copolymer resin (B) having an epoxy group content of 3%, a vinyl acetate content of 5% and a vinyl chloride content of 87%.

SYNTHESIS EXAMPLE 3

Vinyl chloride, allylglycidyl ether, sodium styrene sulfonate and vinyl acetate were emulsion polymerized using potassium persulfate to afford a vinyl chloride copolymer resin (C) having an epoxy group content of 1.5%, a —$SO_3Na$ content of 1.0% and a vinyl chloride content of 87%.

EXAMPLES AND COMPARATIVE EXAMPLES

[Test for heat stability]

1 g of a vinyl chloride copolymer resin shown in Tables 1-3 and 1 g of a polyurethane resin (NIPPOLANE 2304: a trade name for a product of Nippon Polyurethane Kogyo K.K.) were dissolved in tetrahydrofuran. To the mixture was added an additive shown in Tables 1-3 in an amount shown in Tables 1-3 (provided 2-acrylamide-2-methylpropanesulfonic acid was used in the form of an equimolar mixture with diethylaminoethyl methacrylate to render it solvent-soluble; this is the same in a test for gloss and a test for durability). Further, 0.4 g of polyisocyanate (CORONATE L: a trade name for a product of Nippon Polyurethane Kogyo K.K.) was added, followed by coating the mixture with a doctor blade. The solvent was evaporated to form a cast film. 1 g of the cast film was put in a 15 cc test tube, and the opening was closed by a cotten wadding with a Congo Red test paper in between. The test tube was put in an oil bath of 150° C. A time was measured that lapsed until the Congo Red test paper was discolored with hydrochloric acid generated, and a heat stability was evaluated.

[Test for gloss]

400 parts of a cobalt coated magnetic iron oxide powder, 70 parts of a vinyl chloride copolymer resin shown in Table 1-3, 30 parts of the same polyurethane resin as used in the test for heat stability, the additive shown in Tables 1-3 in the amount shown in Tables 1-3, 300 parts of methyl ethyl ketone, 300 parts of methyl isobutyl ketone and 300 parts of toluene were mixed, and the mixture was subjected to shear dispersion at high speed for 90 minutes. Further, 20 parts of the same polyisocyanate as used in the test for heat stability was added, and they were mixed and dispersed for 10 minutes to provide a magnetic coating. In Run Nos. 9, 10, 20, 21, 30 & 31 where an unsaturated group-containing compound was used as an additive, polyisocyanate was not added.

The thus obtained magnetic coating was coated on a polyester film so that a thickness of a coated film was 5 microns, and the coated film was treated by orientation in a magnetic field and then dried. A reflectance of the magnetic coated film with an angle of incidence and an angle of reflection being 60° was measured by means of a gloss meter. The larger the value the better the dispersibility of the magnetic powder.

[Test for durability]

The magnetic coated film used in the test for gloss was smoothed with a calendering roll, and closslinked and aged in a constant temperature bath for 30 hours. In Run Nos. 9, 10, 20, 21, 30 & 31 where an unsaturated group-containing compound was used and polyisocyanate was not added, the irradiation of electron rays at 10 megarad was performed using an electron ray accelerator.

The magnetic coated film was contacted with a rotary drum 40 mm in diameter to which was attached an abrasive paper under a load of 100 g, and rotated at 150 rpm for a given period of time. Subsequently, an extent of contamination on the abrasive paper was evaluated with the following three grades.

O: not contaminated
Δ: slightly contaminated
X: heavily contaminated

The test results are shown in Tables 1-3.

TABLE 1

| Run No. | Vinyl chloride copolymer resin | Additive (phosphoric acid ester compound) | Amount (equivalent ratio)*4 Test for heat stability | Test for gloss. Test for durability | Heat stability (min) | Gloss (%) | Durability |
| --- | --- | --- | --- | --- | --- | --- | --- |
| 1 | A | Mixture of mono- and di-tridecyl-polyoxyethylene (7) phosphates | 0.2 g (0.44) | 8 parts (0.25) | 40 | 80 | O |
| 2 | B | Mixture of mono- and di-norylphenyl-polyoxyethylene (6) phosphates | 0.2 g (0.54) | 8 parts (0.34) | 41 | 65 | O |
| 3 | C | Dioctyl phosphate | 0.2 g (1.78) | 8 parts (1.02) | 37 | 78 | O |
| 4 | A | Monobutyl phosphate | 0.2 g (3.19) | 8 parts (1.82) | 40 | 79 | O |
| 5 | B | [C$_5$H$_{11}$COO(CH$_2$CH$_2$O)$_2$]$_2$PO(OH) | 0.2 g (0.61) | 8 parts (0.35) | 40 | 64 | O |
| 6*1 | B | — | — (—) | — (—) | 39 | 30 | X |
| 7*1 | VAGH*2 | Mixture of mono- and di-tridecyl-polyoxyethylene (7) phosphates | 0.2 g (0.44) | 8 parts (0.25) | 3 | 70 | Δ |
| 8 | A | [CH$_2$:C(CH$_3$)COO(CH$_2$CH$_2$O)]$_{1.5}$PO(OH)$_{1.5}$ | 0.2 g (1.39) | 8 parts (0.79) | 40 | 79 | O |
| 9 | A | [CH$_2$:C(CH$_3$)COO(CH$_2$CH$_2$O)]$_{1.5}$PO(OH)$_{1.5}$ | 0.2 g (1.39) | 8 parts (0.79) | 40 | 79 | O |
| 10*1 | VMCH*3 | [CH$_2$:C(CH$_3$)COO(CH$_2$CH$_2$O)]$_{1.5}$PO(OH)$_{1.5}$ | 0.2 g (—) | 8 parts (—) | 1 | 60 | X |

*1 Comparative Example
*2 Vinyl chloride-vinyl acetate-vinyl alcohol copolymer resin made by Union Carbide Corporation
*3 Vinyl chloride-vinyl acetate-maleic acid copolymer resin made by Union Carbide Corporation
*4 Ratio to chemical equivalent of an epoxy group in a vinyl chloride copolymers resin

TABLE 2

| Run No. | Vinyl chloride copolymer resin | Additive (carboxylic acid compound) Type | pKa | Amount (equivalent ratio)*3 Test for heat stability | Test for gloss. Test for durability | Heat stability (min) | Gloss (%) | Durability |
| --- | --- | --- | --- | --- | --- | --- | --- | --- |
| 11 | A | Maleic acid | 2.85 | 0.03 g (0.8) | 2.4 parts (0.8) | 41 | 82 | O |
| 12 | B | Maleic acid | 2.00 | 0.03 g (0.8) | 2.3 parts (0.8) | 40 | 67 | O |
| 13 | C | Salicylic acid | 2.98 | 0.04 g (0.8) | 2.7 parts (0.8) | 38 | 78 | O |
| 14 | A | Pyruvic acid | 2.49 | 0.06 g (0.8) | 4.0 parts (0.8) | 39 | 81 | O |
| 15 | B | Fumaric acid | 3.02 | 0.03 g (0.8) | 2.3 parts (0.8) | 40 | 65 | O |
| 16*1 | B | — | — | — (—) | — (—) | 39 | 32 | X |
| 17*1 | A | Caproic acid | 4.84 | 0.08 g (0.8) | 5.3 parts (0.8) | 39 | 80 | X |
| 18*1 | C | Stearic acid | >4 | 0.08 g (0.8) | 5.5 parts (0.8) | 40 | 79 | X |
| 19*1 | VAGH*2 | Malic acid | 2.85 | 0.03 g (—) | 2.4 parts (—) | 3 | 69 | Δ |
| 20 | A | Maleic acid | 2.0 | 0.04 g (0.8) | 2.6 parts (0.8) | 41 | 82 | O |
| 21 | VAGH*2 | Maleic acid | 2.0 | 0.04 g (—) | 2.6 parts (—) | 3 | 58 | X |

*1 Comparative Example
*2 Vinyl chloride-vinyl acetate-vinyl alcohol copolymer resin made by Union Carbide Cforporation
*3 Ratio to chemical equivalent of an epoxy group in a vinyl chloride copolymer resin

TABLE 3

| Run No. | Vinyl chloride copolymer resin | Additive (sulfuric acid monoester compound or sulfonic acid compound) | Amount (equivalent ratio)*3 Test for heat stability | Test for gloss. Test for durability | Heat stability (min) | Gloss (%) | Durability |
| --- | --- | --- | --- | --- | --- | --- | --- |
| 21 | A | Lauryl sulfate | 0.16 g (0.8) | 11.5 parts (0.8) | 41 | 84 | O |
| 23 | B | Polyoxyethylene (5) octylether | 0.21 g (0.8) | 14.5 parts (0.8) | 40 | 67 | O |

TABLE 3-continued

| Run No. | Vinyl chloride copolymer resin | Additive (sulfuric acid monoester compound or sulfonic acid compound) | Amount (equivalent ratio)*3 Test for heat stability | Test for gloss. Test for durability | Heat stability (min) | Gloss (%) | Durability |
|---|---|---|---|---|---|---|---|
| 24 | C | sulfuric acid monoester $C_5H_{11}COO(CH_2CH_2O)_2SO_2OH$ | 0.08 g (0.8) | 5.5 parts (0.8) | 38 | 79 | O |
| 25 | A | Dodecylbenzenesulfonic acid | 0.21 g (0:8) | 14.9 parts (0.8) | 40 | 82 | O |
| 26 | B | Dioctyl sulfosuccinate | 0.24 g (0.8) | 16.5 parts (0.8) | 39 | 66 | O |
| 27*1 | B | — | — (—) | — (—) | 39 | 32 | X |
| 28*1 | A | — | — (—) | — (—) | 41 | 81 | X |
| 29*1 | VAGH*2 | — | — (—) | — (—) | 3 | 69 | Δ |
| 30 | A | 2-Acrylamide-2-methylpropanesulfonic acid | 0.14 g (0.8) | 9.4 parts (0.8) | 40 | 80 | O |
| 31 | VAGH*2 | 2-Acrylamide-2-methylpropanesulfonic acid | 0.14 g (—) | 9.4 parts (—) | 3 | 65 | X |

*1Comparative Example
*2Vinyl chloride-vinyl acetate-vinyl alcohol copolymer resin made by Union Carbide Corporation
*3Ratio to chemical equivalent of an epoxy group in a vinyl chloride copolymers resin From Tables 1-3, it follows that this invention can provide the magnetic recording medium excellent in all of heat stability, dispersibility and durability.

What we claim is:

1. A magnetic recording medium comprising a magnetic layer containing an epoxy group-containing vinyl chloride resin having an average degree of polymerization of 100-1000 and an epoxy group content of 0.1 to 20% by weight and at least one additive selected from the group consisting of (1) a phosphoric acid ester compound, (2) a carboxylic acid compound having pKa of 4 or less, (3) a sulfuric acid monoester compound and (4) a sulfonic acid compound wherein the amount of the additive is 0.05 to 5.0 chemical equivalents per chemical equivalent of the epoxy group in the epoxy group-containing vinyl chloride resin.

2. The magnetic recording medium of claim 1 wherein the epoxy group-containing vinyl chloride resin is obtained by (1) a method wherein vinyl chloride and an epoxy group-containing radical polymerizable monomer copolymerizable with vinyl chloride and if required, another monomer copolymerizable with these monomers are polymerized in the presence of a radical generator, or (2) a method wherein polyvinyl chloride or a copolymer resin composed mainly of vinyl chloride or a resin obtained by partially dehydrochlorinating these chlorinated substances on heating or contacting with a dehydrochlorinating agent is epoxidized with an epoxidizing agent.

3. The magnetic recording medium of claim 2 wherein the epoxy group-containing radical polymerizable monomer is selected from the group consisting of glycidyl ethers of unsaturated alcohols, glycidyl esters of unsaturated acids and epoxide olefins.

4. The magnetic recording medium of claim 2 wherein another monomer is selected from the group consisting of carboxylic acid vinyl esters, vinyl ethers, halogenated vinylidenes, unsaturated carboxylic acid esters, olefins, unsaturated nitriles and aromatic vinyls.

5. The magnetic recording medium of claim 1 wherein the epoxy group-containing vinyl chloride resin has a hydrophilic group.

6. The magnetic recording medium of claim 1 wherein the additive is the sulfuric acid monoester compound and is selected from the group consisting of compounds represented by formulas, $$ROSO_2OH \quad (a)$$

$$RO(AO)_nSO_2OH \quad (b) \text{ and}$$

$$RCOO(AO)_nSO_2OH \quad (c)$$

wherein
R denotes an alkyl group having 1 to 22 carbon atoms, a phenyl group, an alkylphenyl group, an alkenyl group or an alkenylphenyl group, A denotes an alkylene group having 2 to 4 carbon atoms and n is an integer of 1 to 30.

7. The magnetic recording medium of claim 1 wherein the additive is the sulfonic acid compound and is selected from the group consisting of alkylarylsulfonic acids, arylsulfonic acids, alkylsulfonic acids, dialkyl sulfosuccinates, polyoxyethylenealkylallylether sulfosuccinic acids and naphthalenesulfonic acid.

8. The magnetic recording medium of claim 1 wherein the additive is the phosphoric acid ester compound and is selected from the group consisting of compounds represented by formulas, $$(RO)_lPO(OH)_{3-l} \quad (a)$$

$$[RO(A)_n]_lPO(OH)_{3-l} \quad (b) \text{ and}$$

$$[RCOO(AO)_n]_lPO(OH)_{3-l} \quad (c)$$

wherein
R denotes an alkyl group having 1 to 22 carbon atoms, a phenyl group, an alkylphenyl group or an alkenyl group, A denotes an alkylene group having 2 to 4 carbon atoms, l is 1 to 3 and n is 1 to 30.

9. The magnetic recording medium of claim 1 wherein the additive is the carboxylic acid compound having pKa of 4 or less and is selected from the group consisting of saturated or unsaturated aliphatic monobasic or polybasic carboxylic acid compounds, and aromatic monobasic or polybasic carboxylic acid compounds.

* * * * *